Jan. 28, 1941.  G. F. WIKLE  2,229,713
METHOD AND APPARATUS FOR SLITTING TIRE TREADS
Filed April 28, 1939  8 Sheets-Sheet 1

Fig. 1.

INVENTOR.
GEORGE F. WIKLE
BY
ATTORNEYS.

Fig. 2.

Jan. 28, 1941.  G. F. WIKLE  2,229,713
METHOD AND APPARATUS FOR SLITTING TIRE TREADS
Filed April 28, 1939  8 Sheets-Sheet 3

Fig. 3

INVENTOR.
GEORGE F. WIKLE
BY [signature]
ATTORNEYS.

Jan. 28, 1941.  G. F. WIKLE  2,229,713
METHOD AND APPARATUS FOR SLITTING TIRE TREADS
Filed April 28, 1939  8 Sheets-Sheet 4

Fig. 4

INVENTOR.
GEORGE F. WIKLE
BY
ATTORNEYS.

Jan. 28, 1941.    G. F. WIKLE    2,229,713
METHOD AND APPARATUS FOR SLITTING TIRE TREADS
Filed April 28, 1939    8 Sheets-Sheet 5

Fig. 5

INVENTOR.
GEORGE F. WIKLE
BY
ATTORNEYS.

Fig. 6

Patented Jan. 28, 1941

2,229,713

UNITED STATES PATENT OFFICE 2,229,713

METHOD AND APPARATUS FOR SLITTING TIRE TREADS

George F. Wikle, Detroit, Mich., assignor to United States Rubber Company, New York, N. Y., a corporation of New Jersey Application April 28, 1939, Serial No. 270,502

19 Claims. (Cl. 164—61)

This invention relates to a method and apparatus for slitting treads of pneumatic tires, and in particular it relates to automatic means for providing transverse slits adjacent the tread surface of the tire in combination with transverse slits below the surface of the tire tread.

In the manufacture of pneumatic tires it has been found beneficial to provide transverse surface slits in the tire treads which function to provide the tire with certain desirable antiskid properties when in service. Since the depth to which the surface slits may be extended into the tire tread, without detriment to the tire, is limited, it has also been found desirable to supply additional transverse slits in the tire tread below the tread surface and spaced intermediately of the surface slits. The sub-surface slits come into operation at the exposed surface of the tread when substantially one-half of the tread thickness has been worn away and the original surface slits have been rendered ineffective. At this time the sub-surface slits function in the place of the original surface slits to provide the anti-skid properties desired. The combination of such surface slits and sub-surface slits in a tire provides the tire with anti-skid properties throughout substantially the entire life of the tire.

In accordance with the practice of my invention, I provide a production apparatus for slitting tire treads arranged to detachably secure a tire in position while an oscillating rotary knife blade and a pair of reciprocating knife blades simultaneously form surface and sub-surface slits, respectively, in the tread of the tire. After each combined surface and sub-surface slitting operation, a predetermined increment of rotary motion is automatically imparted to the tire to reposition the tire for the next slitting operation. The slitting operations and intermediate rotary motions of the tire continue automatically in a step by step manner until the entire circumference of the tire has been processed. At such time stop means, provided upon the apparatus, automatically renders the said knife blades inactive. Manually controlled fluid operable means is also provided in the apparatus for moving and collapsing parts thereof to enable an attendant to more easily and readily replace one tire by another between tire processing operations of the apparatus. This apparatus functions safely, automatically, and efficiently in providing uniform combinations of surface and sub-surface slits in the treads of pneumatic tires. These objects and other advantages will appear more fully in the following detailed description when considered in connection with the accompanying drawings, in which:

Figure 1:
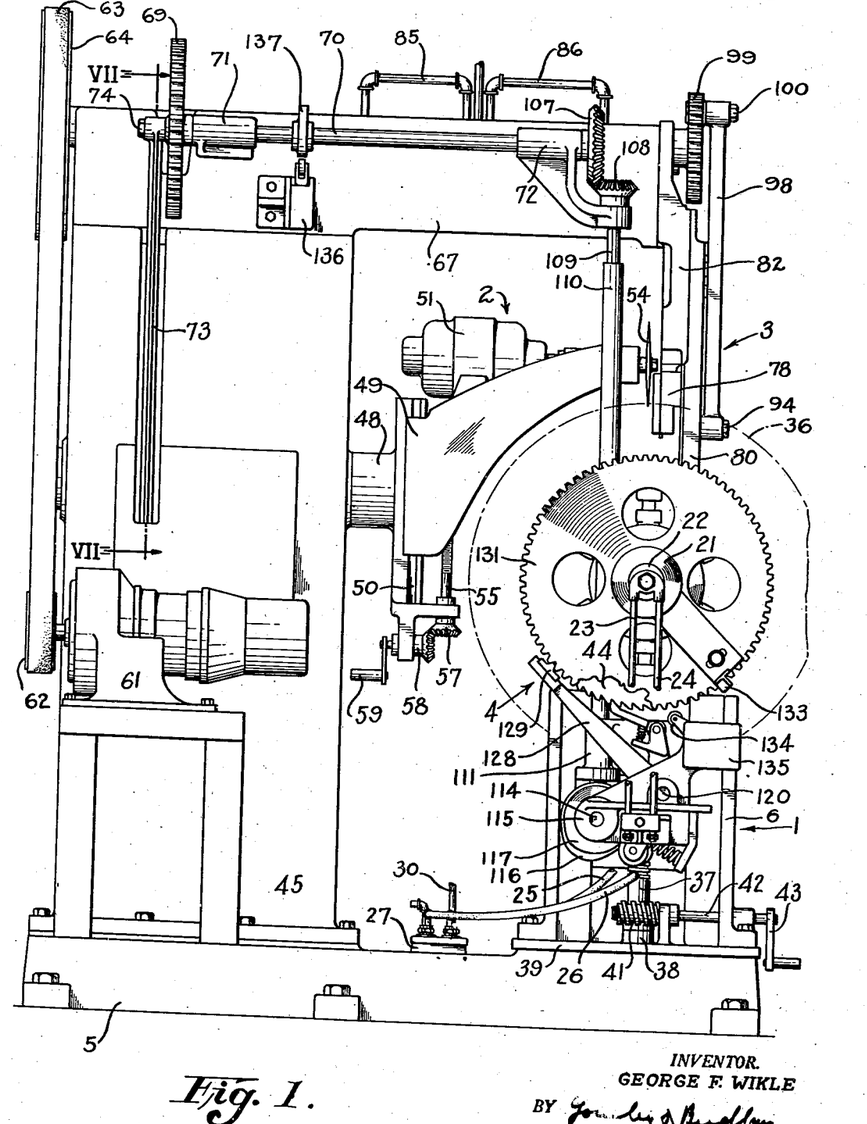
Fig. 1 is a side view illustrating an apparatus embodying the features of my invention.
Figure 2:
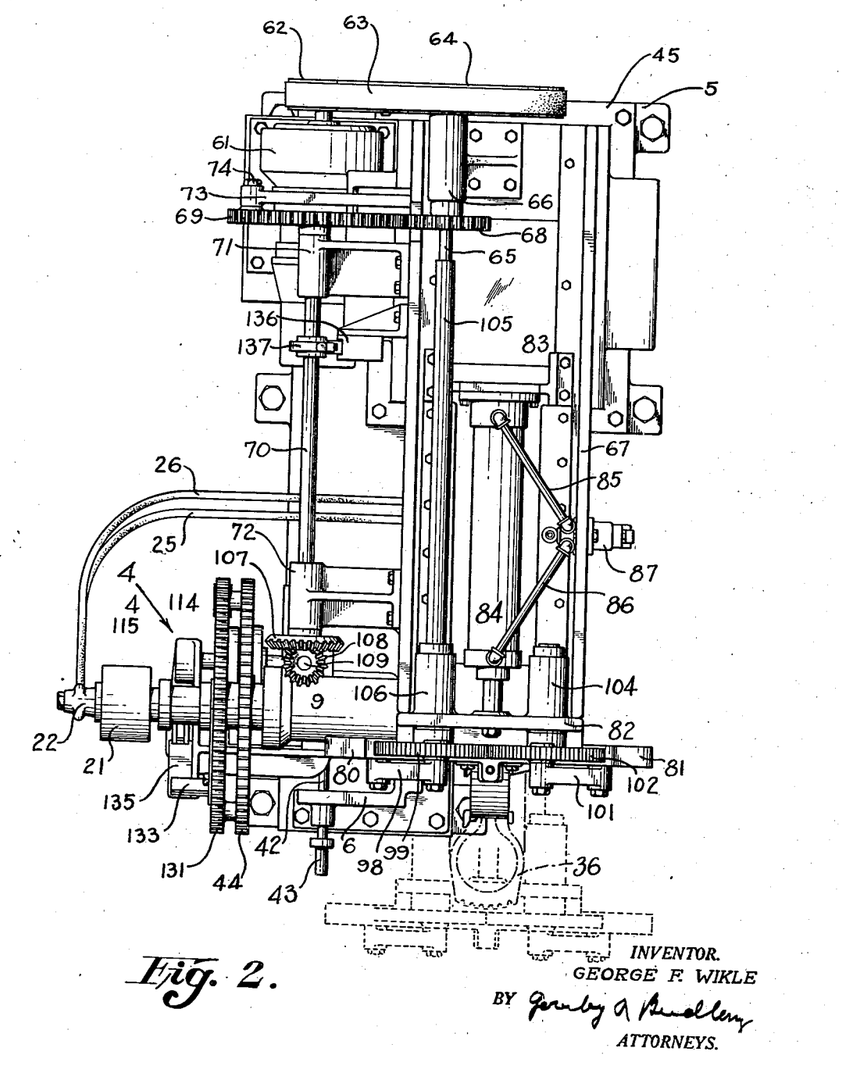
Fig. 2 is a plan elevational view thereof.
Figure 4:
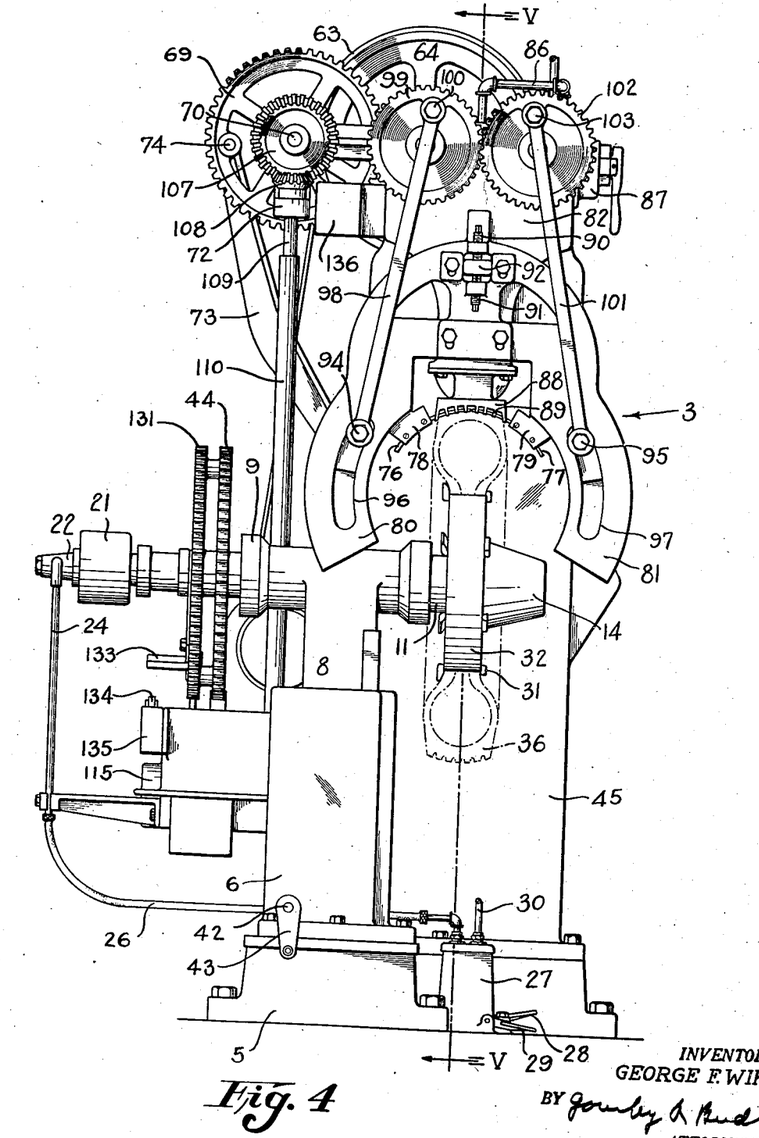
Fig. 4 is an end elevational view of the apparatus.

Referring to the drawings, I show an embodiment of my invention in the form of an apparatus including a tire support 1 (Figs. 1, 5 and 6), a tread surface slitting mechanism 2 (Figs. 1 and 5), a tread sub-surface slitting or sub-slitting mechanism 3 (Figs. 1 and 4), and a tire driving mechanism 4 (Figs. 1 and 2).

*Tire support*

The tire support 1 includes a base member 5 on which is secured a pedestal 6. A groove 7 formed in the pedestal 6 provides a vertical slideway for supporting a vertically movable block 8 which forms a part of a horizontal bearing 9 in which a tire support drive shaft 10 is rotatably mounted. A flange 11 attached to the shaft 10 near one end thereof is provided with a plurality of radially movable pins 12. Associated with each of the pins 12 is a spring 13 which forms an engagement between the pins 12 and the flange 11 whereby the pins 12 tend to move radially inward unless otherwise restrained. Casing 14 attached to the flange 11 pivotally supports a plurality of levers 15, each of which engages with one of the pins 12. Each of the levers 15 includes a roller 16 rotatably mounted at an intermediate position on the arms 15. The rollers 16 engage a cone-shaped cam 17 attached to a rod 18. The cam 17 and rod 18 are slidably mounted within an aperture 19 in the shaft 10. The opposite end of the rod 18 engages with a piston rod 20 of a conventional double acting fluid pressure cylinder 21. The cam 17, rod 18 and cylinder 21 rotate with the shaft 10, and a conventional type of sealing connection is formed between a stationary connection 22 and the rotating cylinder 21. Conduits 23 and 24 (Fig. 1) connect the stationary connection 22 with flexible hose connections 25 and 26 respectively, and to a conventional foot operated fluid valve 27. Pedals 28 (Fig. 6) and 29 permit manual foot operation of the valve 27 for controlling operation of the cylinder 21 and for moving the cone-shaped cam 17 axially. Conduit 30 extends from the valve 27 to a source of fluid pressure supply.

Each of the pins 12 is secured to a rim segment 31 having flanges for supporting a tire. A band 32 attached to one of the segments 31 forms a rim base on which a tire 36 rests. The band 32 has loose ends 33 and 34 to permit expansion or contraction of the chuck formed by the pins 12 and associated mechanism. A short length of band 35 serves to fill the gap between the ends 33 and 34 of the band 32 when the latter band is in expanded position. The band 32 is of spring material, so that it will conform with the surfaces of the segments 31 whether in contracted or expanded position.

The chuck mechanism, before the application of a tire, remains in a contracted position. While in this position, the tire 36 may be mounted on the band 32 and within the flanges of the segments 31. While the tire rests in this position, the operator may depress the foot pedal 29, causing actuation of the fluid cylinder 21 and moving the cam 17 to an outward position, thus causing pins 12 to expand for holding the tire 36 in tight engagement with the band 32. To remove the tire from the support, the operator presses the foot pedal 28, thus collapsing the chuck mechanism and permitting removal of the tire.

In order to accommodate different size tires, means is provided for raising or lowering the chuck mechanism relative to the cutting mechanisms 2 and 3. The movable block member 8, is slidably associated with the pedestal 6, and is actuated by a threaded shaft 37 supported by a bearing 38 forming part of a plate 39 attached to the base 5. A worm wheel 40 keyed to the shaft 37 meshes with a worm gear 41 keyed on a shaft 42 mounted in bearings supported by the pedestal 6. A hand crank 43 (Fig. 5) provides means for manually rotating the worm gear 41, which results in the elevating or lowering of the tire 36.

A ratchet wheel 44 (Fig. 1), keyed to the shaft 10 and associated with driving mechanism hereinafter described, provides means for imparting increments of rotary movement to the tire 36.

Tread surface slitting mechanism

Figure 5:
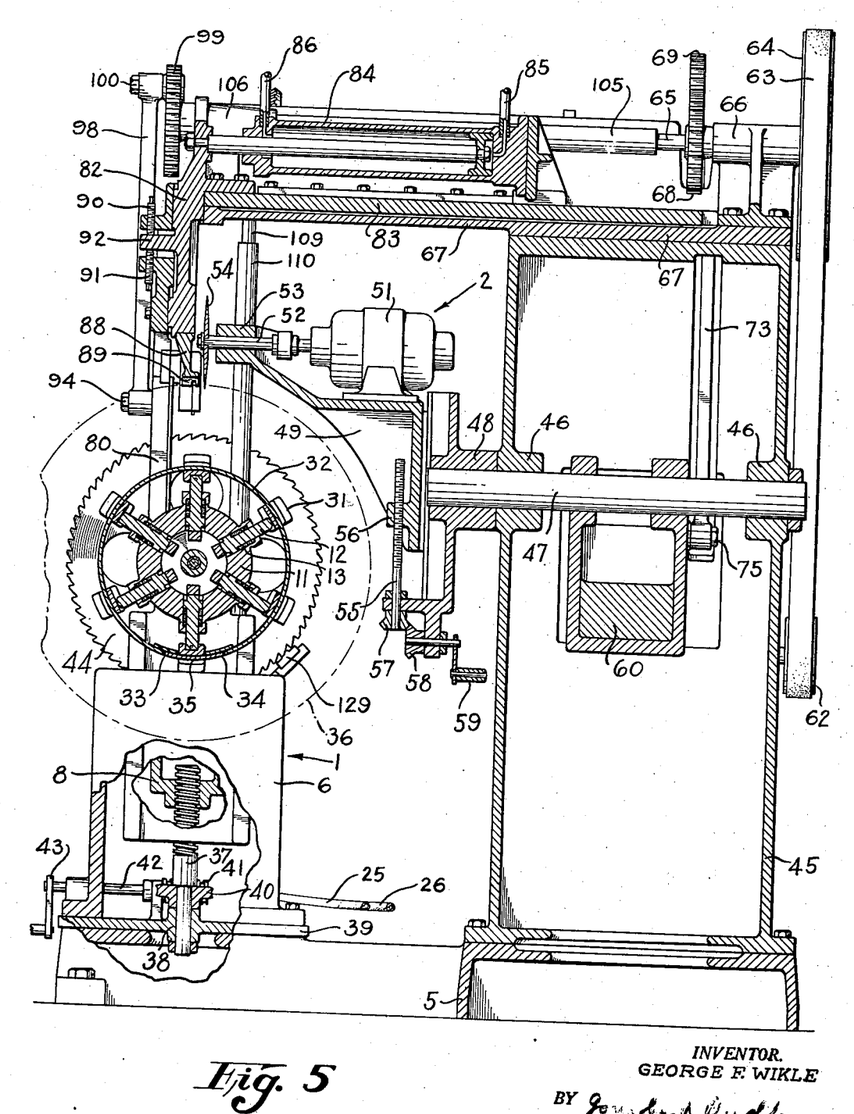
Fig. 5 is a side elevational view, partly in section and partly broken away, of my invention taken substantially along section line V—V of Fig. 4.
Figure 6:
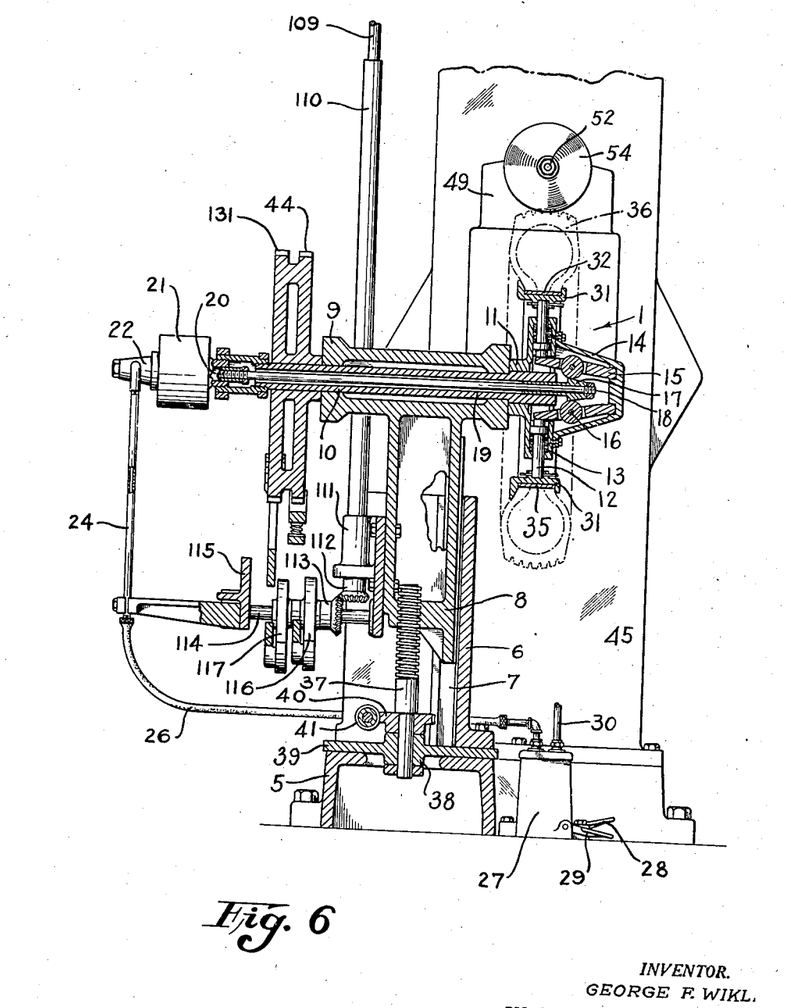
Fig. 6 is an end elevational view, partly in section, the section being taken along section line VI—VI of Fig. 3.

The tire 36, after it is mounted upon the chuck mechanism 1, is subjected to the action of a surface slitting mechanism 2 illustrated in particular by Figs. 1 and 5. The purpose of the slitting mechanism is to provide transverse incisions in the tread of a tire, the depth of the incisions being substantially equal to one-half the height of the anti-skid elements forming the tread configuration. These slits communicate with the surface of the tread and are formed without the removal of substantially any of the rubber composition.

A housing 45 attached to the base member 5 includes bearing 46 in which a shaft 47 is rotatably mounted. The shaft 47 is positioned horizontally and within the transaxial plane of the tire 36. Axially the shaft 47 is in substantial alignment with the center of the radius which defines the transverse contour of the ground or road contacting portion of the tread. A base flange 48 is keyed to the shaft 47 at one end thereof. A bracket 49 is slidably connected to the base flange 48 by means of a slideway 50 formed in the flange 48 and adapted for complementary engagement with the bracket 49.

Mounted on the bracket 49 is a motor 51 coupled with a shaft 52 rotatably mounted in a bearing 53 forming a part of the bracket 49. A disc type cutter 54 is attached with the end of a shaft 52. The location of the disc cutter 54 relative to the tire 36 is such that incisions made in the tire by the disc 54 extend substantially in a transverse radial plane relative to the axis of the tire.

In order to vary the depth of the incisions, means is provided for adjusting the cutter disc 54 in a vertical path. This means includes a shaft 55 associated by threaded engagement with a lug 56 extending from the bracket 49. The opposite end of the threaded shaft 55 is retained by an arm on the flange 48, and a miter gear 57 keyed to the shaft 55 meshes with a miter gear 58 connected to a hand operated crank 59 mounted at the lower end of the base flange 48. By this mechanism the bracket 49 may be adjusted to various positions along the slideway 50 and in relation to the base flange 48.

Attached to the shaft 47 and within the housing 45 is a weight member 60 located in a position for substantially counterbalancing the slitting mechanism 2.

To form the slits in the tire 36, the cutter disc 54 is reciprocated transversely of the tire to cause incisions in the tread during intermittent rest periods of the tire after increments of rotary motion are imparted to the tire. Cutter disc 54 driven by the motor 51 is rotated continuously throughout the tire slitting operation.

Figures 7, 8:
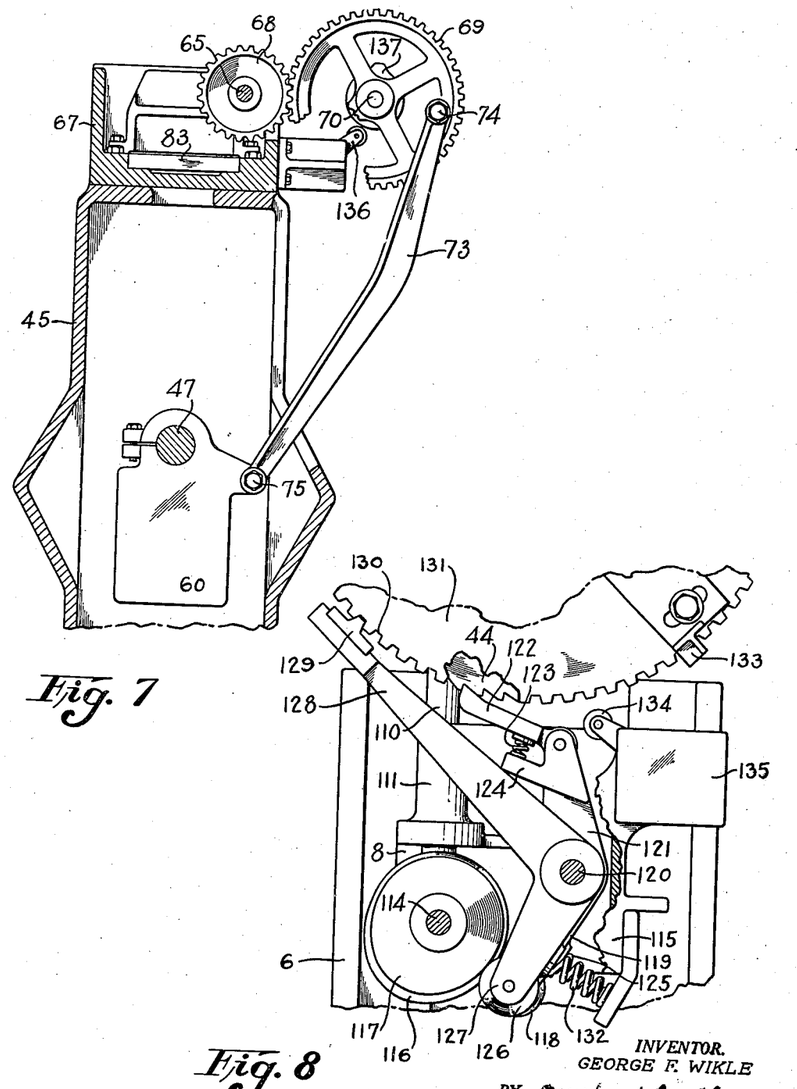
Fig. 7 is a detailed sectional view of a portion of the drive apparatus, the section being taken along section line VII—VII of Fig. 1.
Fig. 8 is an enlarged detailed view of a portion of the mechanism shown in Fig. 1.

Power for reciprocating the tread slitting mechanism transversely of the tire 36 is obtained from a combination electrical brake type motor 61 (Fig. 1). Power is transmitted from a motor pulley 62, belt 63, and pulley 64 keyed to a shaft 65 (Figs. 2 and 5) mounted in a bearing 66 attached to a frame member 67 forming an overhanging extension of the housing 45. A pinion 68 (Fig. 7) keyed to the shaft 65 meshes with a gear 69 keyed to a shaft 70 supported by bearings 71 and 72 (Fig. 2) attached to the extension member 67. A link member 73 pivotally attached at 74 to the gear 69 pivotally joins with the weight member 60 at 75. By this mechanism and through continuous operation of the motor 61 the gear 69 rotates continuously, which, through the connecting links 73, results in reciprocating movement of the shaft 47 and of the slitting mechanism which is supported by the shaft 47.

Tread sub-slitting mechanism

In cooperable association with the tread slitting mechanism, the invention includes simultaneously operable sub-slitting mechanism or a mechanism which provides slits in the tire tread lying wholly below the road contacting surface of the tread. The sub-slits or sub-surface slits in the tread are obtained by arcuate knife blades 76 and 77 (Fig. 4) which move in an arcuate path, toward each other piercing the outer sidewalls of the tread and each forming a transverse slit extending substantially to the center of the tread. The leading portions of the blades 76 and 77 (Fig. 10) meet at approximately the center of the tread and jointly form an arcuate slit which extends transversely of and below the surface of the tread throughout substantially the full width thereof.

The blades 76 and 77 are adjustably secured by holders 78 and 79, respectively, which in turn are slidably retained in segmental brackets 80 and 81, respectively, supported by a frame 82. Segmental brackets 80 and 81 are vertically adjustable to permit variations in elevation of the knife blades 76 and 77. Adjusting screws 90 and 91 retained in projections extending from the brackets 80 and 81 engage with a lug 92 extending from the frame 82 for the purpose of adjustably locking the brackets 80 and 81 in proper vertical position. The frame 82 is attached to a block 83 slidably retained for horizontal movement in the extension member 67 (Fig. 5). The purpose of this sliding arrangement between the block 83 and the remaining portion of the structure is to permit the sub-slitting mechanism to be moved out of engagement with the chuck mechanism, to facilitate the mounting or removal of tires 36 with the chuck mechanism. The dotted lines shown in Fig. 2 indicate the sub-slitting mechanism moved into its outward position.

Figure 3:
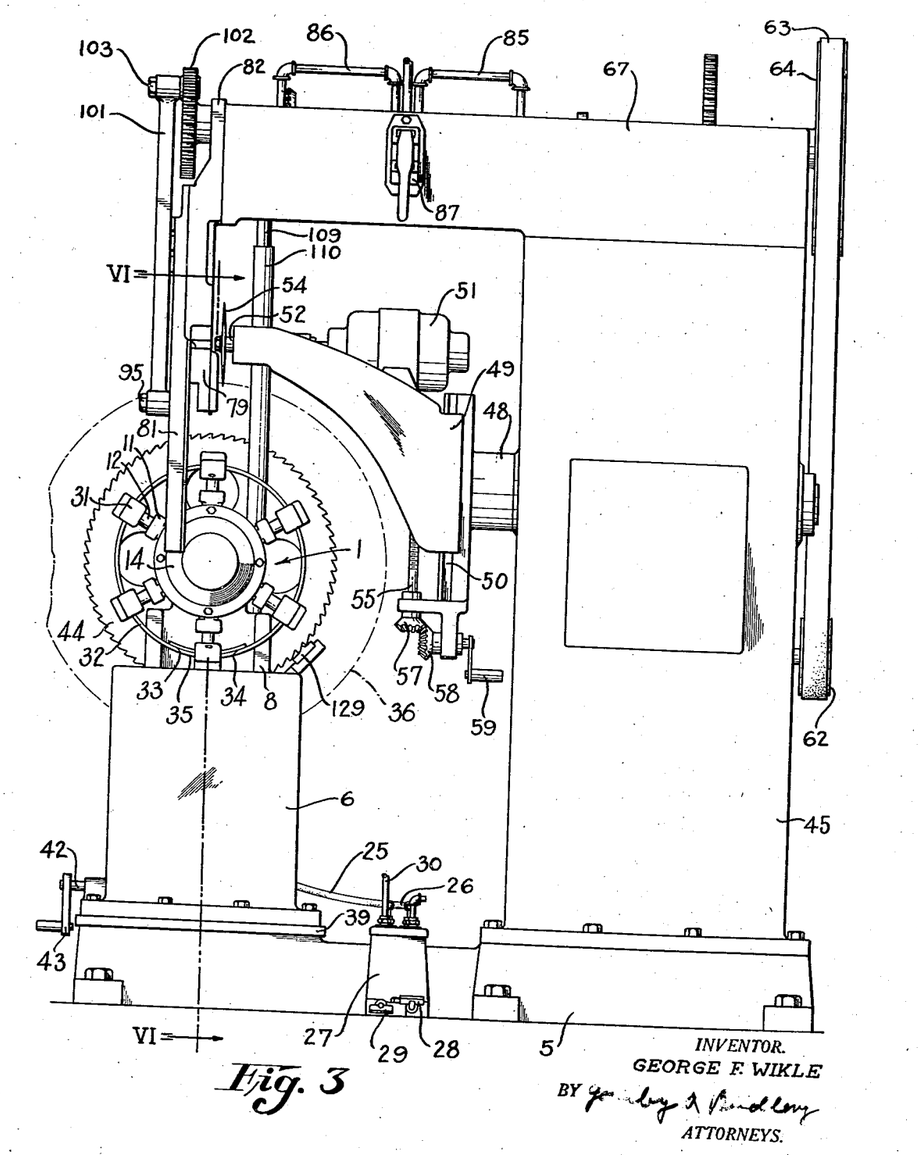
Fig. 3 is an elevational view illustrating the opposite side of the apparatus from that shown in Fig. 1.

Means for moving the sub-slitting mechanism out of engagement with the assembled tire is provided in the form of a fluid operable cylinder 84 which, through conduits 85 and 86 connected to a hand operated valve 87 (Fig. 3), permits manual control of the sub-slitting mechanism. When a tire 36 is mounted on the chuck mechanism of the tire support 1, the sub-slitting mechanism is in an outward position to provide adequate clearance for mounting a tire on the support. After the tire is securely supported the operator manipulates the valve 87, causing the sub-slitting mechanism to advance toward the tire and to stop at a predetermined point which provides proper spacing between the knife blades 76 and 77 and the circular knife 54.

Because of the instability of the tire during the sub-slitting operation by the knife blades 76 and 77, means is provided to add rigidity to the tire during the sub-slitting operation, and to guide the knife blades being forced into the tread. A guide member 88 (Fig. 4) having a plurality of projections 89 is positioned for engagement with the tire 36 in such manner as to permit the projections 89 to extend into the circumferentially extending grooves in the tire tread. The guide member 88 is rigidly attached to the frame 82. As shown more particularly in Fig. 10, the projections 89 of the guide member 88 are provided with transversely extending slots 93 which serve as guides for the knife blades 76 and 77. The guide member 88 is associated with the tread of the tire 36 in substantially contacting relation; however, sufficient clearance is permitted between the tire and the guide member to allow rotation of the tire without resistance by the guide member 88.

Throughout the slitting operation, knife blades 76 and 77 are continuously reciprocated in an arcuate path. Pivotal connections 94 and 95 (Fig. 4) projecting from the knife holders 78 and 79 extend through arcuate slots 96 and 97 in the segmental brackets 80 and 81, respectively. A connecting link 98 joins the knife holder 78 with a gear 99 at a crank position 100. In a similar manner, the knife holder 79 through a connecting link 101 joins with a gear 102 at a crank position 103. The gear 102 meshes with the gear 99, and as the gears rotate the knife blades 76 and 77 operate in an opposing manner in reciprocating arcuate strokes. The gear 102 is supported on a short shaft mounted in a bearing 104 (Fig. 2) forming a part of the frame member 82. The gear 99 is keyed to a shaft 105 mounted in a bearing 106 forming a part of the frame member 82. The shaft 105 is tubular in form, and telescopically cooperates with the shaft 65 in splined or keyed, axially slidable engagement. By this arrangement the sub-slitting mechanism may be moved into or out of engagement with the tire support without affecting the drive of the shaft 105.

Tire driving mechanism

The tire driving mechanism 4 functions to impart predetermined increments of rotary motion intermittently to the tire 36 so that adjacent portions of the tire treads are successively positioned for simultaneous slitting and sub-slitting operations.

As previously described, the shaft 70 (Fig. 1) is driven by the continuously rotating gear 69. A beveled gear 107 carried by the shaft 70 meshes with a beveled gear 108 keyed to a vertical shaft 109. A tubular vertical shaft 110 telescopes the shaft 109 in a keyed and axially slidable relation to permit vertical adjustment of the shaft 110. The lower end of the shaft 110 is supported by a bearing 111 (Fig. 6) attached to the vertically movable block 8. A beveled gear 112 keyed to the shaft 110 meshes with a beveled gear 113 keyed to a shaft 114. The shaft 114 is mounted at one end in a bearing attached to and extending from the vertically movable block 8 and at the other end by a bracket 115 also attached to the block 8.

Keyed to the shaft 114 is a pair of cams 116 and 117. The cam 116 (Fig. 8) engages with a follower 118 connected to a lever 119 pivotally mounted on a shaft 120 carried by the bracket 115. An extension 121 of the arm 119 pivotally supports a pawl 122 which is engageable with the ratchet wheel 44. A spring 123 is interposed between the pawl 122 and a lug 124 projecting from the extension 121 and yieldably maintains the pawl in contact relation with the ratchet wheel 44. A spring 125 maintains the follower 118 in contact relation with the cam 116. As the cam 116 rotates, movement is transmitted through the lever 119 to the pawl 122 which rotates the ratchet wheel 44 in progressive steps, thereby providing increments of rotary motion to the tire 36 with which the ratchet wheel 44 communicates.

To provide proper circumferential spacing of the slits in the tire, and to overcome any error which may arise due to momentum of the tire when moved by the pawl and ratchet wheel, a locking means is utilized to center and retain the tire in a fixed predetermined position during the simultaneous surface slitting and sub-slitting operations. The cam 117 engages with a follower 126 attached to a lever arm 127 also pivotally mounted on the shaft 120. An extension 128 of the lever arm 127 carries a latch 129 for engagement with indentations 130 in a toothed wheel 131. The toothed wheel 131 is rigidly attached to the ratchet wheel 44. A spring 132 maintains the follower 126 in contact engagement with the cam 117. The ratchet mechanism and the locking mechanism, through the cams 116 and 117, respectively, function jointly to move the ratchet wheel 44 a circumferential distance equal to the spacing between successive notches and to maintain the ratchet wheel in a centered lock position until the next period of advancement. The spacing between successive peripheral notches upon the ratchet wheel 44 and the corresponding spacing between successive peripheral indentations upon the toothed wheel 131 may be uniform or varied, as desired, to form uniformly or non-uniformly spaced slits in the tire tread being processed.

The ratchet mechanism and locking mechanism, together with the surface slitting and sub-slitting operations, are synchronized in a manner so as to impart increments of rotary motion to the tire during only those periods in which the slitting knives are at the ends of their stroke cycle and free of the tire tread. In the case of the rotary slitting knife 54, one cycle of its operation consists in a single movement of the knife cutting a single slit transversely of the tire. The return movement of the rotary knife forms a new slit, and a new stroke cycle. Simultaneously with one cycle of the rotary knife, one cycle of the sub-slitting knife blades 76 and 77 is completed and consists of the blades 76 and 77 moving into and out of engagement with the tire tread, each knife blade forming a part of the sub-surface slit from the side portion of the tread to substantially the circumferential center thereof.

It will be apparent that when a tire is to be positioned on the tire support, both the surface slitting knife and the sub-slitting knives are located at the remote ends of their cutting strokes and out of the way so as not to interfere with this operation. Means is provided for stopping the apparatus when a tire has been slitted throughout its entire circumference. As the tire makes a complete cycle of 360 degrees, a cam 133 (Fig. 1) attached to the toothed wheel 131 engages a roller arm 134 which operates an electric switch 135. This switch functions through conventional wiring, not shown, to cut off the current leading to the motor 61. The motor 61 is of conventional type, which includes automatic electric brake mechanism which functions to apply the brake to the motor at the time the operating current to the motor is cut off. Instead of forming a direct connection between the switch 135 and the motor 61, the wire is routed through a second switch 136 which cooperates with a cam 137 keyed to the shaft 70. The switch 136 operates to prevent stopping of the apparatus while the slitting knives are in engagement with the tire tread. In other words, the switch 135 breaks the circuit upon a complete revolution of the tire, contingent upon continued operation of the apparatus until the knife blades are entirely removed from contact with the tire tread.

Figures 9, 10, 11:
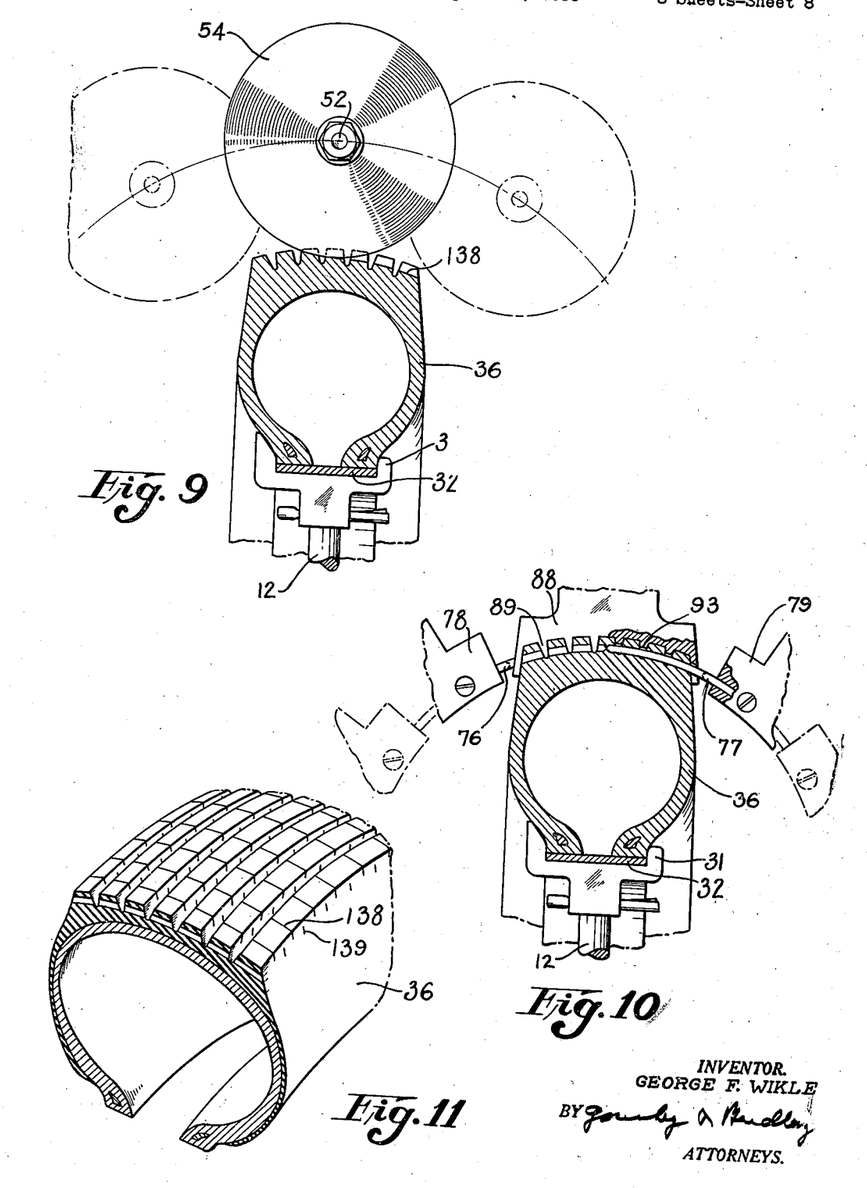
Fig. 9 is a diagrammatic view illustrating a portion of a tire in cross section, showing the tire in relation to the surface slitting knife.
Fig. 10 is a similar diagrammatic view, showing a portion of the tire in relation to sub-surface cutting blades.
Fig. 11 is a perspective view, in section, of a portion of a pneumatic tire treated in accordance with the practice of my invention.

As shown in Figs. 9, 10 and 11, the rotary knife 54 functions to form in the tire tread a transversely extending surface slit 138 of a depth substantially equal to one-half the height of the anti-skid elements of the tire. The knife blades 76 and 77, simultaneously with the operation of the knife blade 54, function to form a sub-surface slit 139 in the tread of the tire at a point below the surface thereof substantially equal to one-half the height of the anti-skid elements, and having a depth substantially equal to one-half the height of the anti-skid elements. One of the slits 138 and an adjacent slit 139 are formed in the tread simultaneously; thereafter, the tire is indexed through an increment of rotary motion before the next similar pair of surface and sub-surface slits are formed in the tread. This step by step slitting and sub-slitting operation continues automatically until the slits are formed in spaced relation throughout the entire circumference of the tire tread.

At the end of the 360° cycle of operation, the apparatus comes to rest and the operator presses foot pedal 28 which causes the chuck mechanism to collapse. At the same time, the operator operates the hand valve 87 which causes the slitting mechanism 2 to move to an outward position; thereafter, the tire may be manually removed from the support and another tire mounted thereon for treatment in a similar cycle of operation.

My tire slitting apparatus is so constructed and arranged that either surface slitting or sub-surface slitting of a tire tread can be performed separately, when desired. It is only necessary to disconnect the driving means for the surface slitting mechanism or the driving means for the sub-surface slitting mechanism in order to render one or the other inoperative. However, such will not interrupt or prevent the proper operation of the remainder of the apparatus in performing the particular surface slitting or sub-slitting operation desired.

While I have shown and described a preferred embodiment of my invention and method of practicing it, it is to be understood that it may be otherwise embodied and practiced within the scope of the appended claims.

Having thus described my invention, what I claim and desire to protect by Letters Patent is:

1. An apparatus for slitting tire treads comprising, a support for a tire, means for imparting increments of rotary motion to the tire, means for forming slits transversely of and communicating with the surface of the tire tread, and means normally positioned laterally of, and movable laterally to, the tire on said support for forming slits transversely of and below the surface of the tire tread.

2. An apparatus for slitting tire treads comprising, a support for a tire, means for imparting increments of rotary motion to the tire, means for forming slits transversely of and communicating with the surface of the tire tread, and simultaneously operable means normally positioned laterally of, and movable laterally to, the tire on said support for forming slits transversely of and below the surface of the tire tread.

3. An apparatus for slitting tire treads comprising, a support for a tire, means for imparting increments of rotary motion to the tire, a rotary circular knife movable transversely of the tire tread for forming in the tread slits which communicate with the surface of the tread, and an arcuate knife blade for forming slits transversely of and below the surface of the tire tread.

4. An apparatus for slitting tire treads comprising, a support for a tire, means for imparting increments of rotary motion to the tire, a rotary circular knife movable transversely of the tire tread for forming in the tread slits which communicate with the surface of the tread, and arcuate knife blades movable in arcuate paths and engageable with the side portions of the tire tread for forming incisions in the tread below the surface thereof.

5. An apparatus for slitting tire treads comprising, a support for a tire, means for imparting increments of rotary motion to the tire, a rotary circular knife movable transversely of the tire tread for forming in the tread slits which communicate with the surface of the tread, and an arcuate knife blade movable in an arcuate path and engageable with the side portion of the tire tread for forming an incision in the tread below the surface thereof, said knife being operable to cause said incision to extend transversely from the side portion of the tire tread to substantially the circumferential center of the tread.

6. An apparatus for slitting tire treads comprising, a support for a tire, means for imparting increments of rotary motion to the tire, a rotary circular knife movable transversely of the tire tread for forming in the tread slits which communicate with the surface of the tread, and a pair of opposed arcuate knife blades adapted to engage opposite portions of a tire tread and operable simultaneously to form a transverse incision in the tread and below the surface thereof.

7. An apparatus for slitting tire treads comprising, a support for a tire, means for imparting increments of rotary motion to the tire, a rotary circular knife movable transversely of the tire tread for forming in the tread slits which communicate with the surface of the tread, a pair of opposed arcuate knife blades adapted to engage opposite portions of a tire tread and operable simultaneously to form a transverse incision in the tread and below the surface thereof, and means engageable with the tire tread for guiding the knife blades during the slitting operation.

8. In an apparatus for slitting treads of pneumatic tires having circumferentially extending grooves, a pair of opposed arcuate knife blades adapted to engage opposite portions of a tire tread and operable simultaneously to form a transverse incision in the tread and below the surface thereof, and means located within at least one of the tread grooves for guiding the knife blades during the slitting operation.

9. The method of slitting treads of pneumatic tires comprising the steps of advancing a knife blade in a transverse plane and in an arcuate path from the side portion of the tread to substantially the center of the tread whereby a slit is formed below the surface of the tire tread.

10. The method of slitting treads of pneumatic tires comprising the steps of advancing a knife blade in a transverse plane and in an arcuate path from the side portion of the tread to substantially the center of the tread, and simultaneously advancing a second knife blade from the transversely opposite side portion of the tread whereby a substantially continuous arcuate slit is formed below the surface of the tire tread.

11. An apparatus for slitting tire treads comprising a support for a tire, a rotary circular knife movable transversely of the tire tread for forming in the tread slits which communicate with the surface of the tread, arcuate blades movable in arcuate paths transversely of the tire tread and arranged to penetrate the side walls thereof for forming incisions in the tread below the tread surface, means for moving said rotary knife and arcuate blades simultaneously, and means for imparting increments of rotary movement to the tire intermediate successive slitting operations of said rotary knife and arcuate blades during operation of the apparatus.

12. An apparatus for slitting tire treads comprising a support for a tire, a rotary circular knife movable transversely of the tire tread for forming in the tread slits which communicate with the surface of the tread, arcuate blades movable in arcuate paths transversely of the tread and arranged to penetrate the side walls thereof for forming incisions in the tread below the tread surface, means for moving said rotary knife and arcuate blades simultaneously for forming said slits, means for imparting increments of rotary movement to the tire intermediate successive slitting operations during operation of the apparatus, and manually controlled power means for moving said arcuate blades to a position remote from said tire tread when said blades are inactive.

13. An apparatus for slitting tire treads comprising a support for a tire, a rotary circular knife movable transversely of the tire tread for forming in the tread slits which communicate with the surface of the tread, arcuate blades movable in arcuate paths transversely of the tread and arranged to penetrate the side walls of the tread intermediate and below adjacent surface slits for forming incisions in the tread below the tread surface, means for moving said circular knife and arcuate blades simultaneously for forming said slits, and means for imparting increments of rotary movement to the tire intermediate successive slitting operations of said rotary knife and arcuate blades during operation of the apparatus.

14. An apparatus for slitting tire treads comprising a support for a tire, a rotary circular knife movable transversely of the tire tread for forming in the tread slits which communicate with the surface of the tread, arcuate blades movable in arcuate paths transversely of the tread and arranged to penetrate the side walls thereof for forming incisions in the tread below the tread surface, means for moving said rotary knife and arcuate blades simultaneously for forming said slits, means for imparting increments of rotary movement to the tire intermediate successive slitting operations during operation of the apparatus, manually controlled power means for moving said arcuate blades to a position remote from said tire tread when said blades are inactive, and stop means automatically operable to terminate said slitting operations when the tire has reached a predetermined angular position.

15. An apparatus for slitting tire treads comprising a support for a tire, means for imparting increments of rotary movement to the tire, a slitting mechanism comprising a rotary circular knife and motor operatively interconnected for forming transverse slits in tire tread which communicate with the tread surface, means located in the central longitudinal plane of the tire and exteriorly of the tire for pivotally supporting said slitting mechanism for transverse vertical swinging movement, and means carried by said pivotal supporting means arranged to counterbalance said slitting mechanism during operation of the apparatus.

16. An apparatus for slitting tire treads comprising a support for a tire, means for imparting increments of rotary motion to the tire, a knife movable transversely of the tire tread for forming in the tread slits which communicate with the surface of the tread, a pair of opposed arcuate knife blades adapted to engage opposite sides of a tire tread and form simultaneously a transverse incision below the tread surface, and power transmitting means for rotating said tire after each combined surface and sub-surface slitting operation.

17. A tire support comprising a base, an expansible tire supporting chuck rotatably carried by said base, said chuck comprising a plurality of radially extending pins and a circumferentially extending expansible tire supporting band carried by said pins and biasing said pins inwardly, and manually operable fluid control means operatively associated with said chuck, for expanding the pins and band of said chuck when a tire is positioned thereon.

18. A tire support comprising a base, an expansible tire supporting chuck and driving gear rotatably carried by said base, ratchet mechanism comprising driving and centering means for imparting increments of rotary motion to said gear and tire supporting chuck and releasably holding same in predetermined positions between successive increments, and manually operable fluid control means operatively connected to said chuck for expanding said chuck when a tire is positioned thereon.

19. A tire support comprising a base, an expansible plunger operated tire supporting chuck and driving gear rotatably carried by said base, ratchet mechanism comprising driving and centering means for imparting increments of rotary motion to said chuck and releasably holding same in predetermined positions between successive increments, and manually operable fluid control means operatively connected to said plunger for expanding said chuck when a tire is positioned thereon.

GEORGE F. WIKLE.